United States Patent [19]

Desfontaines

[11] Patent Number: 4,623,512

[45] Date of Patent: Nov. 18, 1986

[54] DEVICE FOR FIXING A FUEL ARRAY TO THE LOWER CORE-SUPPORTING PLATE IN A NUCLEAR REACTOR

[75] Inventor: Guy Desfontaines, Puteaux, France

[73] Assignee: Framatome & Cie., Courbevoie, France

[21] Appl. No.: 753,344

[22] Filed: Jul. 10, 1985

Related U.S. Application Data

[63] Continuation of Ser. No. 442,216, Nov. 16, 1982, abandoned.

[30] Foreign Application Priority Data

Dec. 4, 1981 [FR] France ................ 81 22754

[51] Int. Cl.$^4$ .............................................. G21C 3/30
[52] U.S. Cl. .................................................. 376/364
[58] Field of Search ................ 376/178, 362, 364, 433

[56] References Cited

U.S. PATENT DOCUMENTS

| | | | |
|---|---|---|---|
| 3,635,793 | 1/1972 | Kolb et al. | 376/364 |
| 3,814,667 | 6/1974 | Klumb et al. | 376/364 |
| 4,038,133 | 7/1977 | Bittermann et al. | 376/364 |
| 4,194,948 | 3/1980 | Ledin | 376/364 |
| 4,381,284 | 4/1983 | Gjertsen | 376/364 |

FOREIGN PATENT DOCUMENTS 1159971 7/1969 United Kingdom .

Primary Examiner—Charles T. Jordan
Assistant Examiner—Richard Klein
Attorney, Agent, or Firm—Pollock, Vande Sande & Priddy

[57] ABSTRACT

Device for fixing a fuel assembly to the lower core plate of a nuclear reactor, comprising a fastening element (23) fixed to the lower core plate (18), in the central part of the opening (19) in this plate (18) corresponding to the assembly, an expandable sleeve fixed to the lower end (3) of the assembly in its central part, a guide tube (10) passing through the assembly in its central part in the axial direction, a rod (25) mounted for sliding movement in the tube (10) and fixed to an oval locking knob (38), and a socket (26) fixed to the upper end of the bar (25) and having a gripping surface for a lifting tool. The fastening element has an axial opening (31) for engagement of the expandable sleeve. The bar (25) and the socket (26) allow displacement of the oval knob (38) between service and out-of-service positions in which the latter spreads the expandable sleeve inside the opening (31) in order to fix the assembly.

3 Claims, 2 Drawing Figures

DEVICE FOR FIXING A FUEL ARRAY TO THE LOWER CORE-SUPPORTING PLATE IN A NUCLEAR REACTOR

This application is a continuation of application Ser. No. 442,216, filed Nov. 16, 1982, now abandoned.

FIELD OF THE INVENTION

The invention relates to a device for fixing a fuel array to the lower core-supporting plate in a nuclear reactor.

BACKGROUND OF THE INVENTION

A nuclear reactor, such as a pressurized water reactor, comprises a core formed by prismatic arrays arranged side by side inside the reactor vessel and resting on the lower core-supporting plate, which is arranged transversely relative to the axis of the vessel.

Each of the arrays consists of a bundle of parallel fuel rods located between two ends and extending in the longitudinal direction of the array. The arrays rest with one of their ends, or lower end, on the lower core-supporting plate, so that the direction of the fuel rods, or axial direction of the array, is vertical. Each of the arrays is arranged on the lower core-supporting plate, in correspondence with an opening passing through this plate.

In its upper part, the core is limited by a horizontal plate parallel to the core-supporting plate, and also pierced with openings opposite each of the fuel arrays.

In this way, the reactor cooling fluid, for example pressurized water, which is fed in under the lower core plate, passes through the arrays from bottom to top, cooling them at the same time, and leaves at the upper part of the core to transfer the heat from the latter to the heat exchangers.

In the case of certain pressurized water reactors, the arrays have a hexagonal cross-section and are arranged next to one another in the reactor core, so as to form a uniform mesh in the transverse planes of the core. These arrays are not arranged continuously, so as to avoid lateral interference between the arrays, in the reactor in operation.

A clearance of the order of three millimeters is therefore maintained between the lateral faces of the hexagonal-based prisms consituting the outer envelope of the arrays. This clearance is maintained by means of centering elements, such as studs, arranged on the upper plate and on the core supporting base, cooperating with housings providing in the corresponding ends of the arrays and making it possible to keep the arrays in position laterally, relative to one another. A clearance must be provided between the centering studs and their housing, this clearance generally being of the order of one millimeter. These clearances make it possible to compensate the discrepancies in alignment between the centering studs of the upper core plate and the corresponding studs of the core-supporting base, and also to compensate the effects of the differential expansion between the upper core plate and the lower plate for supporting this core.

An axial clearance must also be provided in order to avoid interference in the axial direction, due to the differential expansion between the arrays and the upper plate and the lower core-supporting plate, respectively.

The cooling fluid passing through the core at high speed, from bottom to top, exerts a vertical force on the arrays, which tends to displace them upwards. Impacts between the arrays and the upper plate or the lower core-supporting plate, respectively, are thus capable of being produced during the starting or stopping of the primary pumps.

To overcome this disadvantage, holding devices are used which make it possible to prevent the impacts between the arrays and the upper and lower core plates, while at the same time permitting relative axial displacements due to expansion.

For example, springs have been used which are arranged between the upper part of the array and the upper core plate and which exert, on these arrays vertical forces directed downwards, for holding the latter against the lower core-supporting plate. However, these springs exert, on the structure of the arrays, i.e., on the guide tubes joined to each of the ends or on the case of the array, compression forces which can result in buckling of the fuel array.

It has also been proposed to fasten the array to the lower core-supporting plate by means of elements projecting from the upper face of the core-supporting plate and firmly fixed to the latter. These projecting elements are arranged in the region of the corners of the array and possess locking surfaces which cooperate with a locking element carried by the array.

However, a fixing device of this type is bulky and of complex construction and makes the positioning of the arrays in the core more difficult.

SUMMARY OF THE INVENTION

The object of the invention is thus to propose a device for fixing a fuel array to the lower core-supporting plate in a nuclear reactor comprising a core formed by prismatic arrays arranged side by side inside the reactor vessel and consisting of a bundle of parallel fuel rods located between two ends in the longitudinal direction of the array, or axial direction, and resting vertically on the lower core-supporting plate via one of the ends, or lower end, in correspondence with openings provided in this plate, the core being limited in its upper part by an upper core plate pierced with openings in the region of each of the arrays, this fixing device being of simple construction and of low bulk, while at the same time having a high degree of efficiency.

For this purpose, the fixing device according to the invention comprises:

a fastening element fixed to the lower core plate, in the central part of the opening in this plate corresponding to the array, and having an axial opening providing fastening surfaces, an expandable sleeve having a shape complementary to that of the opening in the fastening element, and fixed to the lower end of the array in its central part, in the axial direction, a guide tube passing through the array in the axial direction, in its central part, a bar mounted so as to slide in the guide tube, having a length greater than that of the tube and firmly fixed, at its lower end, to an oval locking knob having a diameter sufficient to permit the expansion of the sleeve and the locking of the latter to the fastening element by axial displacement of the bar between and out-of-service position and a service position, in which the oval knob is introduced into the sleeve so as to expand it, and a socket firmly fixed to the upper end of the bar and having a gripping surface for a lifting tool, resting on the upper end of the array, when the bar is in its service position.

BRIEF DESCRIPTION OF THE DRAWINGS

To provide a clear understanding of the invention, a fixing device according to the invention, for a fuel array of hexagonal cross-section, used in an undermoderated nuclear reactor cooled by pressurized water, will be described by way of example, with reference to the attached drawings.

DETAILED DESCRIPTION

Figure 1:
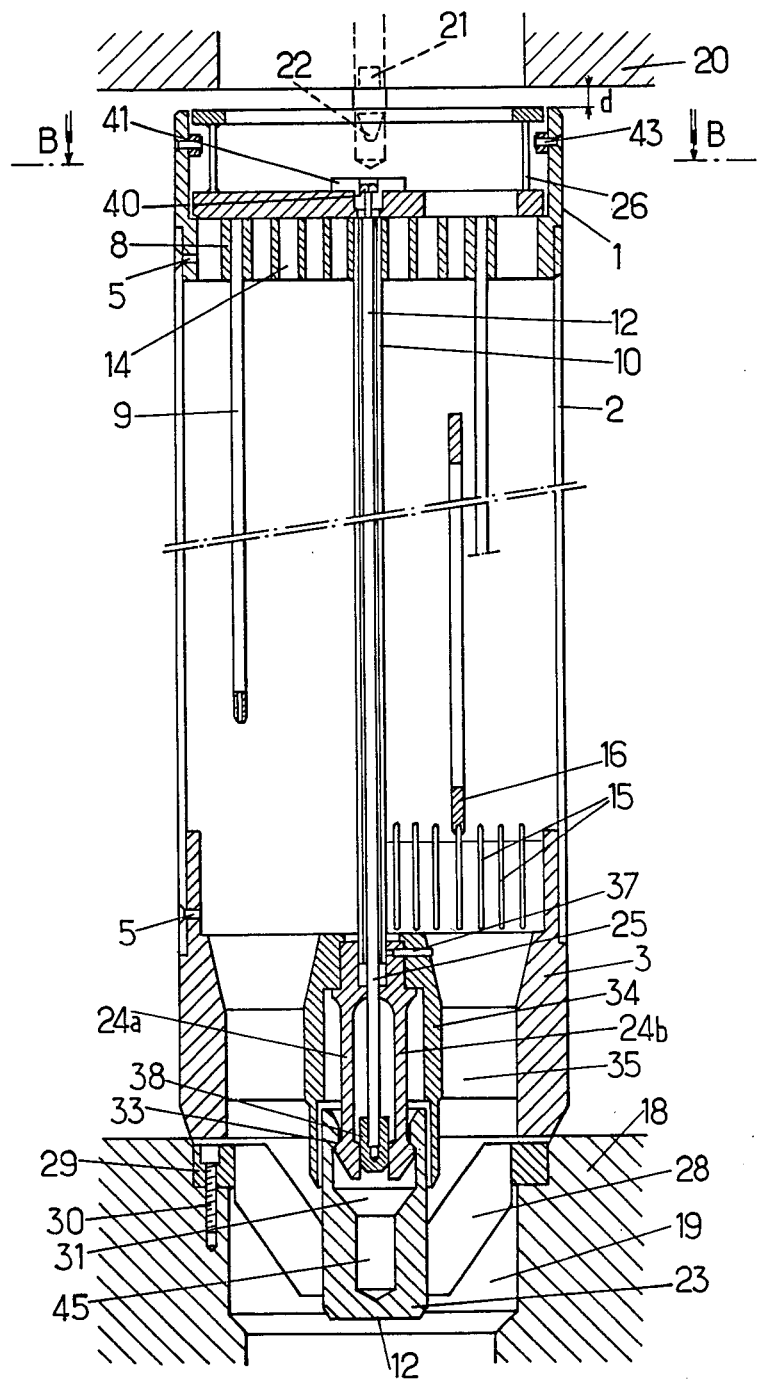
FIG. 1 shows a view in section of the array, through a vertical plane along A—A of FIG. 2.
Figure 2:
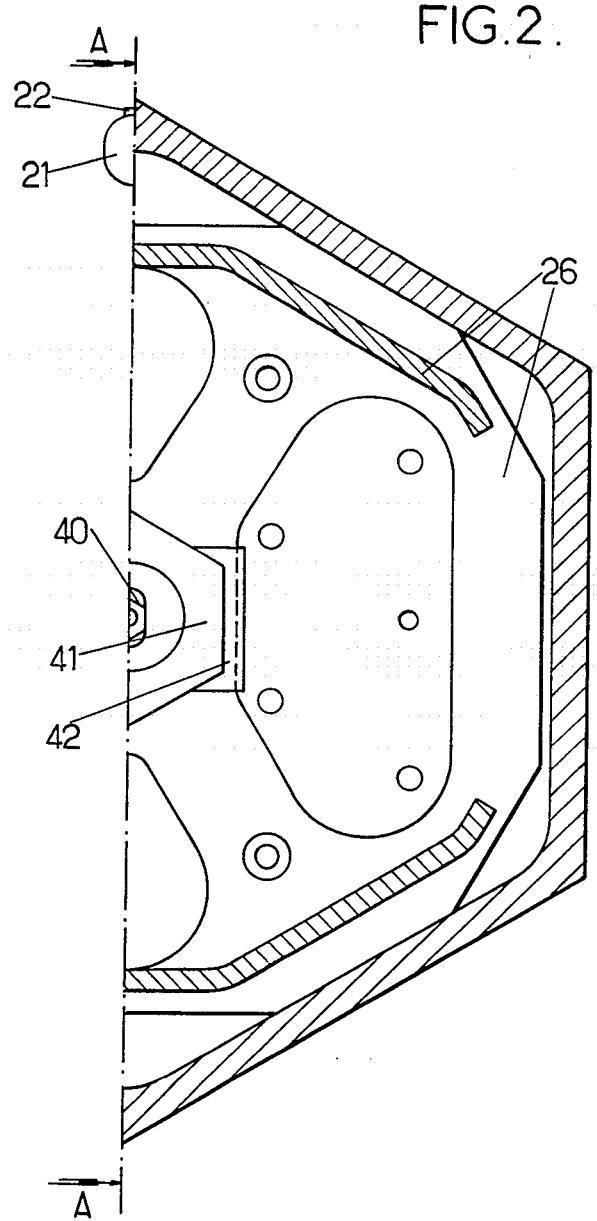
FIG. 2 shows a half-view in section of the array, along B—B of FIG. 1.

The array shown in FIGS. 1 and 2 comprises, from top to bottom, an upper end 1, a casing and a lower end 3. These three elements of hexagonal cross-section are joined to one another by screws 5.

The upper end 1 has circular openings 8 for the fixing of the guide tubes 9, which are welded to the upper end 1.

A guide tube 10 is fixed to the central part of the array, its axis coincides with the axis 12 of the array and it passes through the latter over the whole height between the two ends.

The upper end 1 is also pierced with openings 14 permitting the circulation of the pressurized water for cooling the array, in the axial direction, The lower end 3 carries, in its upper part, a grid 15 for fixing the fissile or fertile fuel rods 16, inside the casing, in a uniform lattice with triangular meshes.

Each of the rods 16 is kept in its position in the lattice by a spacer consisting of a wire wound in a helix around its external surface. In this way, the moderation ratio remains very low and the neutron flux remains within the epithermal range.

In an undermoderated reactor, a certain proportion of fertile material, for example uranium depleted in U 235, is arranged in certain parts of the arrays and in certain parts of the core, in order to produce fissile material from the fertile material.

In its part arranged above the grid 15, the lower end, of tubular shape, permits the channeling of the pressurized water entering the array.

This lower end 3 rests on the lower core-supporting plate 18, in correspondence with an opening 19 passing through this plate over the whole of its thickness.

In this way, the pressurized water fed in under the lower core-supporting plate passes through the latter by the opening 19, and then enters the array by the lower end 3, which channels it before it is brought into contact with the rods 16 fixed to the grid 15.

The lower plate 18 carries centering studs, not shown, which are engaged when the array is in position on the lower core-supporting plate, as shown in FIG. 1, in openings provided in the lower end 3. In this way, the array is placed in the vertical position so that its axis 12 corresponds to the axis of the opening 19.

The upper core plate 20, arranged above the arrays with a clearance d of the order 5 mm, also carries centering studs 21, which engage, when the array is in position, in corresponding openings 22 provided in the upper end 1.

After charging of the core, when the upper core plate 20 is put back in position, all the centering studs 21 come into position inside the openings 22 in each of the arrays.

The device for fixing the array to the lower core-supporting plate 18 comprises, in addition to the guide tube 10 passing through the array over the whole of its height between the ends, a fastening element 23, fixed to the lower core plate, an expandable sleeve comprising expandable plates 24a and 24b, which is produced here in the form of a sleeve with thin flexible plates, fixed to the lower end of the array, a bar 25 mounted for sliding movement in the guide tube 10, and a socket 26 joined to the upper end of the bar 25.

The fastening element 23 is located at the center of the opening 19 in the plate 18 and joined to the latter by a cross-piece 28 firmly fixed to a ring 29, which is itself fixed by screws 30 to the plate 18, around the opening 19.

Fastening element 23 has an opening 31 with a symmetry of revolution around the axis 12 of the array and a conical fastening surface 33 widened towards the bottom.

The lower end 3 carries a central hub 34 via a cross-piece 35, the central opening in this hub having a diameter slightly greater than the diameter of the fastening element 23.

The expandable sleeve 24 is fixed inside the hub 34 by screwing and by locking with the aid of a pin 37.

This sleeve 24 comprises two thin flexible plates 24a and 24b, firmly fixed to the upper part of the sleeve, permitting its fastening to the hub 34. The lower part of the thin plates 24a and 24b constitutes a fastening head in two parts, having conical surfaces which come into contact with the surface 33 provided inside the fastening element 23 when these thin plates are in their separated position, as shown in FIG. 1.

In this position, an oval knob 38, fixed to the lower end of the bar 25, makes it possible to maintain the separation of the thin plates 24a and 24b. Keeping the oval knob 38 in position therefore prohibits any vertical displacement of the assembly relative to the plate 18, under the effect of the cooling fluid circulating at very high speed.

The length of the centering studs, not shown, which are carried by the lower core-supporting plate 18, is such that they provide a first centering of the array relative to the opening 19, and consequently relative to the fastening element 23, before the introduction of the thin plates 24a and 24b into the opening 31 in the fastening element 23. The hub 34 provides the final guiding and also protects the thin plates 24a and 24b during the handling operations. This hub 34 protects the thin plates 24a and 24b, in service, from the vibrations generated by the flow of the cooling fluid.

The sliding bar 25 is firmly fixed to a nut 41 by means of a lock nut 40, the said nut 41 being fixed by screwing to the socket 26, in its central part, and is checked by a small check plate 42.

The socket 26, the bar 25 and the oval knob 38 thus form an assembly which can undergo axial translational movement relative to the array.

A stop 43, fixed to the upper end 1, makes it possible to limit the upward movement of this moveable assembly.

When the assembly is in the low position, as shown in FIG. 1, the socket 26 comes to rest on the upper surface of the end 1.

When the assembly is in the high position, the oval knob 38 is released from the head of the expandable sleeve, with the result that the thin flexible plates 24a and 24b can close together by elasticity or under the effect of a tractive force exerted on the array in the vertical direction and from bottom to top.

For the positioning of the array in the core, the array is brought into its position on the lower core-plate, the centering studs arranged around the opening 19 coming into engagement in the lower end 3, and the oval knob 38 is kept in the released position relative to the head of the expandable sleeve 24, so that, when the array comes to rest on the lower core plate, the sleeve engages in the fastening element 23 under the effect of the weight of the array. The assembly consisting of the socket 26, the bar 25 and the oval knob 38 is then lowered into the low position, as shown in FIG. 1, in order to lock the array to the plate 18.

When charging of the core has ended, the plate 20 is put back in position above the core, the centering studs 21 coming into position in the corresponding openings 22 in the upper ends of the arrays.

If appropriate, the locking of the fastening sleeves of the arrays, by a downward movement of the moveable assembly carrying the oval knob 38 in its lower part, can be effected when the upper core plate is positioned, if the socket 26 projects slightly in its upper part, relative to the array.

The locking of the array makes it possible to prevent its displacement in the vertical direction and upwards, under the effect of the circulation of the pressurized water.

To dismantle the array, after the upper core plate 20 has been raised, it suffices to raise the moveable assembly 26, 25, 38 into its high position by means of a lifting tool engaging the upper part of the socket 26.

In its high position, the oval knob 38 is released from the head of the sleeve, with the result that the thin flexible plates 24a and 24b can close together when the array is raised in order to remove it from the core.

The central opening in the fastening element 23 comprises an extension 45, inside which the oval knob 38 can be pushed with a long bar after the small check plate 42 has been retracted and the nut 41 unscrewed, in the event of breakage of the sliding bar 25. This makes it possible to unlock the sleeve in the event of breakage of the bar 25, which would then be inoperative and would be likely to make it impossible to remove the array. The falling of the oval knob 38 into the housing 45, either by gravity or by thrust as described above, permits the retraction of the thin plates 24a and 24b of the sleeve, in all cases of breakage.

The main advantages of the device according to the invention are to provide very effective locking of the array by an extremely simple maneuver, by virtue of a device of low bulk, arranged in its entirety in the central part of the array and of the opening in the lower core plate, whilst at the same time offering the possibility of removing the array in the event of breakage of the control bar.

The expandable sleeve can comprise more than two thin plates, and these thin plates can be articulated and non-flexible. The expandable sleeve can also be fixed in a different manner to the lower end of the array, and the socket 26 can be produced in a shape different from the hexagonal shape shown in FIG. 2. It suffices to provide effective guiding between this socket and the inner surface of the upper end of the array.

Finally, the device according to the invention is applicable not only to arrays of hexagonal cross-section, such as those used in an undermoderated reactor, but also to hexagonal arrays used in conventional pressurized water reactors, or alternatively to arrays of square cross-section, such as those used in the most common type of pressurized water nuclear reactor.

The invention also applies in the case of the arrays of a fast fission nuclear reactor cooled by liquid sodium.

I claim:

1. In a nuclear reactor comprising a core formed by prismatic assemblies arranged side by side inside the reactor vessel and comprising of a bundle parallel fuel rods (16) located between the two ends (1, 3) in the longitudinal direction of said asembly, or axial direction, and resting vertically on a lower core-supporting plate (18) via one of said ends (3), or lower end, in correspondence with openings (19) provided in said plate (18), said core being limited in its upper part by an upper core plate (20) pierced with openings in the region of each of said assemblies which are fixed to said lower core-supporting plate by fixing devices each comprising fastening means which can be put into action by operating means comprising a rod mounted along the axial direction of said assembly and having an upper end fast with a socket having a gripping surface for a lifting tool, the improvement consisting of fastening means comprising
   (a) a fastening element (23) fast with said lower core plate (18), in the central part of an opening (19) in said plate (18) corresponding to said assembly and having an axial opening (31) closed at its lower end and having fastening surfaces (33);
   (b) a split expandable sleeve having a shape complementary to that of said opening (31) in said fastening element (23), and prolonging the lower end (3) of said assembly in its central part, in the axial direction; and
   (c) a guide tube (10) passing through said assembly in the axial direction, in its central part, in which said rod is mounted for sliding movement, said rod bearing, at its lower end, an oval locking knob (38) having a diameter sufficient to cause expansion of said sleeve and locking of the latter to said fastening element (23) by axial displacment of said rod between an out-of-service position and a service position in which said oval knob (38) is introduced into said sleeve (24) so as to expand it.

2. A fixing device as claimed in claim 1, wherein said axial opening (31) comprises an extension (45) in its lower part, the size of which is sufficient to contain said oval knob (38) for unlockig said expandable sleeve, in the event of breakage of said sliding rod (25).

3. In a nuclear reactor comprising a core formed by prismatic assemblies arranged side by side inside the reactor vessel and comprising a bundle of parallel fuel rods (16) located between the two ends (1, 3) in the longitudinal direction of said assembly, or axial direction, and resting vertically on a lower core-supporting plate (18) via one of said ends (3), or lower end, in correspondence with openings (19) provided in said plate (18), said core being limited in its upper part by an upper core plate (20) pierced with openings in the region of each of said assemblies which are fixed to said lower core-supporting plate by fixing devices each comprising fastening means which can be put into action by operating means comprising a rod mounted along the axial direction of said assembly and having an upper end fast with a socket having a gripping surface for a lifting tool, the improvement consisting of fastening means comprising
(a) a fastening element (23) fast with said lower core plate (18), in the central part of an opening (19) in said plate (18) corresponding to said assembly and having an axial opening (31) closed at its lower end and having fastening surfaces (33);
(b) a split expandable sleeve (24) having a shape complementary to that of said opening (31) in said fastening element (23), and prolonging the lower end (3) of said assembly in its central part, in the axial direction;
(c) a guide tube (10) passing through said assembly in the axial direction, in its central part, in which said rod is mounted for sliding movement, said rod bearing, at its lower end, an oval locking knob (38) having a diameter sufficient to cause expansion of said sleeve (24) and locking of the latter to said fastening element (23) by axial displacement of said rod between an out-of-service position and a service position in which said oval knob (38) is introduced into said sleeve (24) so as to expand it; and
(d) a hub (34) surrounding said sleeve (24) and an upper portion of said fastening element (23) preventing escape of said oval locking knob (38) in the event of failure of said rod (25).

* * * * *